US 6,740,137 B2

(12) United States Patent
Kubokawa et al.

(10) Patent No.: US 6,740,137 B2
(45) Date of Patent: May 25, 2004

(54) COLLAPSIBLE PLEATED FILTER ELEMENT

(75) Inventors: James O. Kubokawa, Saint Paul, MN (US); Allen J. Rivard, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 10/172,700

(22) Filed: Jun. 14, 2002

(65) Prior Publication Data

US 2003/0230061 A1 Dec. 18, 2003

(51) Int. Cl.⁷ ................................................ B01D 45/00
(52) U.S. Cl. ............................ 55/521; 55/444; 55/446; 55/482; 55/486; 55/500; 55/529
(58) Field of Search ....................... 55/521, 444, 446, 55/482, 486, 500, 529

(56) References Cited

U.S. PATENT DOCUMENTS

| | | |
|---|---|---|
| 2,130,107 A | 9/1938 | Somers |
| 2,423,741 A | 7/1947 | Vokes et al. |
| 3,187,489 A | 6/1965 | Bauder et al. |
| 3,280,984 A | 10/1966 | Sexton et al. |
| 3,373,546 A | 3/1968 | Setnan |
| 3,494,113 A | 2/1970 | Kinney |
| 3,506,475 A | 4/1970 | MacDonnell |
| 3,624,161 A | 11/1971 | Bub |
| 3,712,033 A | 1/1973 | Gronholz |
| 3,774,377 A | 11/1973 | Bishop |
| 3,789,589 A | 2/1974 | Delany et al. |
| 4,042,358 A | 8/1977 | Frohmader |
| 4,135,900 A | 1/1979 | Westlin et al. |
| 4,549,887 A | 10/1985 | Joannou |
| 4,617,122 A | 10/1986 | Kruse et al. |
| 4,701,196 A | 10/1987 | Delany |
| 4,756,728 A | 7/1988 | Conrad |
| 4,762,053 A | 8/1988 | Wolfert |
| 4,799,944 A * | 1/1989 | Dixon et al. ............... 55/521 |
| RE33,272 E * | 7/1990 | Turck ........................ 55/521 |
| 4,978,375 A | 12/1990 | Il Yoo |
| 4,999,038 A | 3/1991 | Lundberg |
| 5,015,377 A | 5/1991 | Silvera |
| 5,051,118 A * | 9/1991 | Andreae ..................... 55/521 |
| 5,059,218 A | 10/1991 | Pick |
| 5,075,000 A | 12/1991 | Bernard et al. |
| 5,108,470 A | 4/1992 | Pick |
| 5,217,513 A | 6/1993 | Armbruster |
| 5,252,111 A | 10/1993 | Spencer et al. |
| 5,273,563 A | 12/1993 | Pasch et al. |
| 5,273,564 A | 12/1993 | Hill |
| 5,399,180 A | 3/1995 | Kopp |
| 5,464,461 A | 11/1995 | Whitson et al. |
| 5,505,852 A | 4/1996 | van Rossen |
| 5,571,300 A | 11/1996 | Stemmer |
| 5,595,107 A | 1/1997 | Bivens |
| 5,613,991 A | 3/1997 | Esaki et al. |
| 5,618,324 A | 4/1997 | Sommer et al. |
| 5,639,287 A | 6/1997 | Van de Graaf et al. |
| 5,743,927 A | 4/1998 | Osendorf |
| 5,779,747 A | 7/1998 | Schlör et al. |
| 5,792,228 A | 8/1998 | Fath et al. |
| 5,809,800 A | 9/1998 | Deal |

(List continued on next page.)

FOREIGN PATENT DOCUMENTS

| | | |
|---|---|---|
| CA | 1011265 | 5/1977 |
| CA | 1073826 | 3/1980 |
| EP | 0 479 114 A1 | 4/1992 |
| FR | 1292392 | 4/1962 |
| WO | WO 99/43413 | 9/1999 |
| WO | WO 03/031025 A1 | 4/2003 |

*Primary Examiner*—Minh-Chau T. Pham
(74) *Attorney, Agent, or Firm*—David B. Patchett

(57) ABSTRACT

A reversibly expandable filter element includes pleated filter media and a flexible spacing structure attached to the pleated media that provides the pleated media with uniform pleat spacing.

14 Claims, 1 Drawing Sheet

U.S. PATENT DOCUMENTS

| | | |
|---|---|---|
| 5,814,219 A | 9/1998 | Friedmann et al. |
| 5,820,644 A | 10/1998 | Mori et al. |
| 5,840,094 A | 11/1998 | Osendorf et al. |
| 5,846,302 A | 12/1998 | Putro |
| 5,958,097 A | 9/1999 | Schlör et al. |
| 5,968,217 A | 10/1999 | Stein et al. |
| 6,030,427 A | 2/2000 | Sorice et al. |
| 6,033,453 A | 3/2000 | Weddell, III |
| 6,059,852 A | 5/2000 | Olson |
| 6,179,891 B1 | 1/2001 | Knudsen et al. |
| 6,328,778 B1 | 12/2001 | Richerson et al. |
| 6,579,337 B2 * | 6/2003 | Heilmann et al. ............ 55/521 |
| 6,585,793 B2 * | 7/2003 | Richerson et al. ............ 55/521 |

* cited by examiner

COLLAPSIBLE PLEATED FILTER ELEMENT

FIELD OF THE INVENTION

The present invention relates generally to filters and, more particularly, to a reversibly expandable and collapsible pleated air filter element that can be inserted into a reusable filter frame.

BACKGROUND OF THE INVENTION

Many conventional residential heating and cooling systems include a disposable filter. These filters typically include a frame, a filter material formed of glass fibers or similar material, and a mesh screen or the like that supports the filter material. After a period of use, these filters become dirty or clogged and must be replaced. This is accomplished by replacing the entire filter assembly with a new filter and discarding the old one. Depending on the use of the filter, replacement may be required several times a year. Because the frame and screen are discarded with the assembly even though it is only the filter material that is no longer functional, there is unnecessary waste and cost associated with such filters. In addition, because these filters are rather bulky, they are often purchased as they are needed rather than keeping a large supply on hand. Because purchasing a new filter is not always convenient, replacement can be delayed resulting in reduced efficiency of the system.

Filter assemblies with frames and removable filter elements are known in the prior art. U.S. Pat. No. 3,280,984 (Sexton et al.), for example, discloses a filter assembly comprising a support frame including upstream and downstream grid retaining panels and a flat pad of filter medium disposed in the frame.

U.S. Pat. No. 3,774,377 (Bishop) discloses a filter assembly with a replaceable filter element including a frame, a disposable and replaceable filter medium, and means for retaining the filter medium in a fixed position in the frame.

U.S. Pat. No. 3,789,589 (Delany et al.) discloses a filter assembly including a casing and a drawer arranged in the casing that contains pleated filter media. The drawer includes a plurality of comb-like assemblies having pointed fingers that are disposed in the pockets of the pleated filter media to prevent the filter from collapsing. The filter includes strips extending across each end portion of the downstream side of the filter so the side edges of the downstream folds will be equally spaced.

U.S. Pat. No. 4,042,358 (Frohmader) discloses an air filter formed into an accordion-shaped body having reverse folds forming pockets. The filter includes a string-like pleat spacing member that passes through a series of openings in the pleat walls. The spacing member is intended to equally space the pleats when the filter is in its expanded condition.

U.S. Pat. No. 5,840,094 (Osendorf et al.) discloses a filter assembly including first and second frame members, a filter element, and separate comb-like spacers for retaining the filter pleats in an open spaced manner.

U.S. Pat. No. 6,033,453 (Weddell, III) discloses a reusable frame support rack for supporting and retaining an outstretched, replaceable pleated media filter core. The frame includes a pair of longitudinal angles extending between a pair of transverse angles which carry a flat expanded metal support or reinforcement system.

There remains a need, however, for a collapsible pleated air filter having uniform spacing and cross web stability that can be quickly and easily expanded and inserted into a reusable filter frame.

It would therefore be desirable to provide a reversibly collapsible and expandable pleated air filter having uniform spacing and cross web stability when fully expanded and inserted into a reusable filter frame, but which can be collapsed for compact shipping, storage, and disposal.

SUMMARY OF THE INVENTION

The present invention provides a reversibly collapsible and expandable replaceable filter element for use with a reusable filter frame. The filter element includes pleated filter media and a flexible spacing structure attached to the media. The pleated filter media is reversibly collapsible and expandable and has an inlet side, an outlet side, opposed first and second ends, and an interior face region. The pleated media also includes fold lines each defining a pleat tip and a pair of adjacent panels. To limit the expansion of the filter element, the spacing structure is preferably inelastic.

In one embodiment, the spacing structure is arranged adjacent at least the interior face region of the filter media. By providing the spacing structure adjacent the interior face region, the spacing structure allows the filter media to expand only to a predetermined length corresponding to the length of a corresponding filter frame into which it is to be placed, and limits the degree of expansion of the center portion of the filter media, therefore preventing the filter media from being over expanded. In this embodiment, the spacing structure may be open and contain a plurality of openings that allow for air flow or it may have a closed structure that blocks or interferes with the flow of air through the filter element. If the spacing structure has a closed structure, it will be recognized that the size of the spacing structure must be minimized to minimize the impact of the spacing structure on the flow of air though the filter element, or the spacing structure must be located to minimize its interference with the air flow.

In one aspect, the spacing structure is attached only to the opposed first and second ends of the filter media. In another aspect, the spacing structure is attached over the entire surface of the filter media including the interior face region. In a preferred aspect, the spacing structure contains openings to allow air to flow readily through the structure. In a specific aspect, the spacing structure is an open mesh, net, scrim, screen, or the like containing a plurality of air flow openings, or at least one individual string arranged perpendicular to the pleats.

In one embodiment, the length of the spacing structure between successive pleat tips is less than two times the length of a panel measured from one pleat tip to the next alternating pleat tip so that when the filter element is in its fully expanded condition, the spacing structure forms a generally planar structure and adjacent panels form an angle of less than 180 degrees.

In one aspect of the invention, successive pleat tips define an attachment surface and the spacing structure is attached to the attachment surface. In one embodiment, the spacing structure is arranged along the inlet side of the filter media. In another embodiment, the filter element includes a second spacing structure arranged along the filter media outlet side.

In a more specific aspect, the length of the spacing structure between successive pleat tips is less than the length of a panel measured from one pleat tip to the next alternating pleat tip, whereby when the filter element is in its fully expanded condition, the spacing structure forms a generally planar structure and adjacent panels form an angle of less than 60 degrees.

In another aspect, the spacing structure is formed of a synthetic plastic material. The scrim may be provided in the form of at least one strip arranged perpendicular to the fold lines along the interior face region of the filter media. In a specific embodiment, the length of the spacing structure between successive pleat tips is equal, thereby providing uniform spacing of the pleat tips. In a more specific embodiment, the length of the spacing structure between successive pleat tips is at least 5 millimeters.

In another embodiment, the filter element includes attachment members along the opposed first and second ends of the filter media parallel to the fold lines for securing the filter element to the filter frame. In another aspect of the invention, the attachment members have a stiffness greater than the filter media stiffness.

In another embodiment, the present invention provides a replaceable filter element for use with a reusable filter frame including reversibly collapsible and expandable filter media and a flexible spacing structure containing a plurality of openings attached to the filter media. In this embodiment, the spacing structure can be attached to the opposed first and second ends of the filter media, can be attached to each successive pleat tip over the entire face of the filter media, can be attached to successive pleat tips along the edges of the filter media only, or can be attached to successive pleat tips in the interior face region of the filter media only.

The filter media can be either self-supporting or non self-supporting. If the filter media is non self-supporting, the spacing structure is preferably provided over the entire face of the filter media. If the filter media is self-supporting, the spacing structure may be provided over the entire face of the filter media or over only a portion of the face of the filter media including the interior face region of the filter media.

BRIEF DESCRIPTION OF THE DRAWINGS

The present invention will be further described with reference to the accompanying drawings, in which.

DETAILED DESCRIPTION

Figure 1:
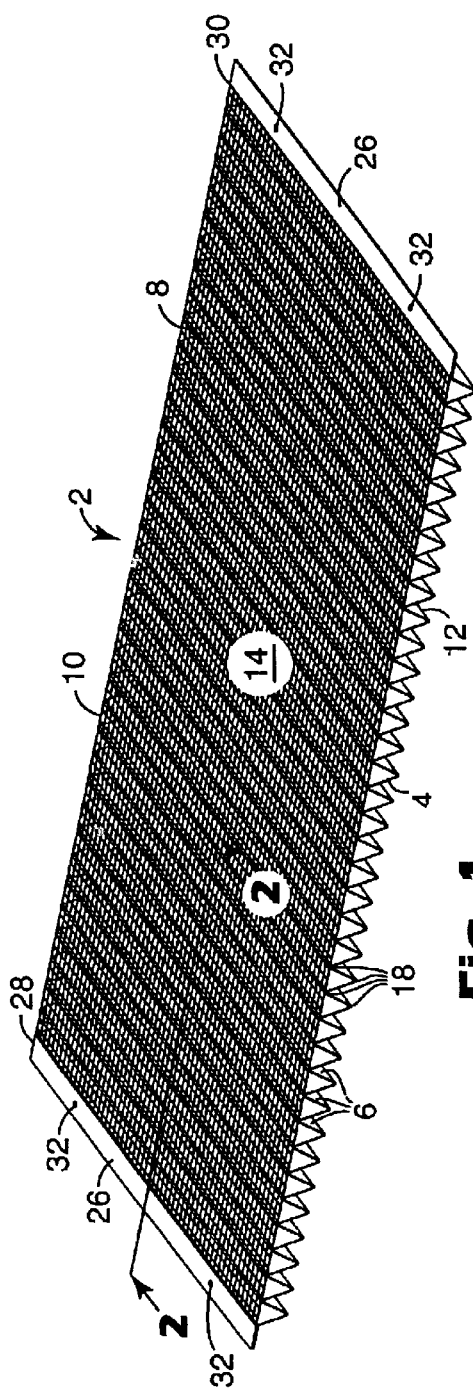
FIG. 1 is a perspective view of the filter element in its fully expanded condition according to the invention.
Figure 2:
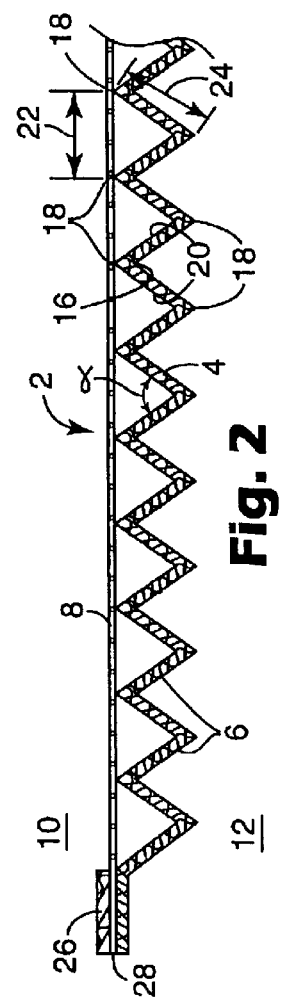
FIG. 2 is a sectional view taken along line 2—2 of FIG. 1.
Figure 3:
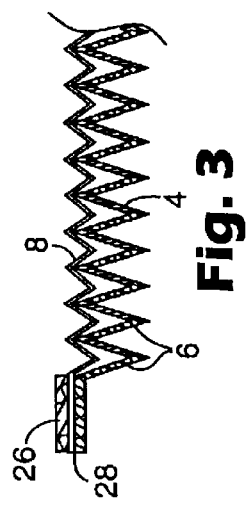
FIG. 3 is a sectional side view of the filter element in a partially collapsed condition.

Referring now to the drawings, wherein like reference numerals refer to like or corresponding parts throughout the several views, FIGS. 1–3 show a reversibly collapsible and expandable pleated filter element 2 including filter media 4 having a plurality of pleats 6 and a spacing structure 8 attached to successive pleat tips 18. "Successive" pleat tips refer to those pleat tips arranged in the same plane that form a planar attachment surface for the spacing structure 8. "Alternate or alternating" pleat tips refer to the pleat tips that are offset from successive pleat tips.

The filter element 2 includes reversibly collapsible and expandable filter media 4 having an inlet face 10 and an outlet face 12, and a flexible, preferably inelastic, spacing structure 8 arranged over the inlet face 10. This construction allows the filter element 2 to be collapsed to a compact form for shipping and storage, expanded to a fixed spacing for attachment to a reusable frame, and removed from the frame and re-collapsed for disposal. The spacing structure 8 allows the filter element 2 to be quickly and easily expanded to a fixed length with fixed pleat spacing and inserted into a frame.

The outlet face 12 is preferably left open to allow a frame that serves to support and space the filter media 4 to enter the pleats. Alternatively, the spacing structure 8 may be provided on the outlet face 12 rather than the inlet side 10, particularly if a self-supporting filter media that does not require a frame for support is used. The filter element 2 may also include a second spacing structure (not shown) along the filter media outlet face 12 similar to the spacing structure provided on the inlet face 10, whereby both the inlet face 10 and outlet face 12 are provided with a spacing structure.

The spacing structure 8 is a flat sheet of material having an open structure that does not significantly interfere with the flow of air through the media 4. The open structure preferably includes a plurality of discrete openings. The spacing structure 8 is thin and flexible so that it can fold in between the pleats 6 or outwardly away from the pleats 6 when the filter element 2 is compressed or collapsed into its compact state as shown in FIG. 3. Suitable spacing structures 8 include scrims, screens, nets, mesh structures or the like formed of, for example, synthetic plastic materials, metals, or natural fibers such as cotton thread. Such a spacing structure 14 may also have filtration properties in addition to acting as a spacer. Alternatively, the spacing structure 8 may be one or more individual strings, threads, wires, or the like formed of similar materials.

To ensure reliable uniform down web spacing and cross web stability, and to ensure easy handling of the filter element 2, the spacing structure 8 is preferably provided over the entire inlet face 10 of the media 4 and attached to each successive pleat tip 18. Alternatively, depending on whether the spacing structure has an open or closed construction, the spacing structure 8 may be provided along one or both edges of the face of the media 4, on one or both edges of the face plus an interior face portion 14 of the media 4, or over only the interior face region 14 of the media 4. This may be accomplished, for example, by providing the spacing structure 8 in the form of one or more strips extending along the face edges of the media 4 or across the interior face region 14 of the media 4 arranged perpendicular to the direction of pleating. The ends of the spacing structure 8 may be attached to only the opposed first and second ends 28, 30 of the filter media 4 and not attached to the interior face region 14 of the media 4, or the spacing structure 8 may be attached the each successive pleat tip 18 along the entire length of the media 4.

The expression "interior face region" refers to the area extending inwardly from the peripheral region of the media 4 adjacent the outer edge of the filter element 2 and includes the central area of the filter element 2. By providing the spacing structure at least in the interior face region 14 of the media 4, the filter element 2 is easy to expand to its full length with uniform spacing while preventing over expansion.

The media 4 includes a plurality of pleats 6 each including a fold line 16 defining a pleat tip 18 and a pair of adjacent panels 20. Successive pleat tips 18 on the inlet side 10 define a planar attachment surface to which the spacing structure 8 is attached. The spacing structure 8 is preferably adhered to the media 4 but other conventional attachment means such as heat lamination or ultrasonic welding may also be used.

The length 22 of the spacing structure 8 between successive pleat tips 18 is less than two times the length 24 of a panel 20 as measured from one pleat tip 18 to the next alternating pleat tip 18. In this manner, when the filter element 2 is fully expanded, the spacing structure 8 forms a generally planar structure and adjacent panels 20 form an angle α of less than 180 degrees.

The length 22 of the spacing structure 8 between successive pleat tips 18 is preferably less than the length 24 of a panel 20 measured from one pleat tip 18 to the next alternating pleat tip, whereby adjacent panels 20 form an angle α of less than 60 degrees when the filter element 2 is in its fully expanded condition. To achieve equal and uniform spacing of the pleats 6, the length 22 of the spacing structure 8 between successive pleat tips 18 is the same.

The spacing distance between successive pleat tips 18 depends of the size of the filter but generally ranges from about 2 millimeters to about 40 millimeters. For most applications, however, the spacing distance between successive pleat tips 18 is preferably at least 5 millimeters and, more preferably at least 8 millimeters.

Elongate attachment members 26 are provided along the opposed first and second ends 28, 30, respectively, of the filter element 2 parallel to fold lines 16. The attachment members 26 preferably have a stiffness greater than the stiffness of the filter media 4. The attachment members 26 provide the ends 28, 30 of the filter element 2 with increased stiffness that improves the handlability of the filter element 2 and allows the filter element 2 to be expanded and collapsed easily and uniformly. In addition, the attachment members 26 provide the ends 28, 30 with increased strength and rigidity so that the filter element 2 can be quickly and easily attached to a frame.

Optional holes 32 in the attachment members 26 are provided to connect the filter element 2 to a filter frame and maintain the filter element 2 in its expanded condition when the filter element 2 is placed in the frame. To ensure the filter element 2 is oriented properly in a frame, a unique hole pattern, such as an asymmetric hole pattern, may be used. Other conventional means for attaching the filter element 2 to the frame such as capturing or pinching the attachment members 26 between the top and bottom halves of the frame, hook and loop fasteners, adhesive, clips, clamps or the like may also be used. The attachment members 26 may be formed of any suitable material including metal foils, paperboard, cardboard, chipboard, synthetic plastic materials including plastic film, or multiple layers of filter media laminated together.

The filter element 2 is intended for use with a reusable filter frame in a residential heating or cooling system. Accordingly, the filter element 2 has a depth of less than 5 inches, preferably less than 2 inches, and more preferably less than 1 inch, has a width of less than 40 inches, preferably less than 30 inches, and has a height of less than 30 inches, preferably less than 25 inches.

While any pleated fibrous filter media may be used, a preferred filter media is an electrostatically charged media. The media may be either relatively stiff and self-supporting or relatively soft and non self-supporting. By "self-supporting" it is meant that the media, with or without a spacing structure, generally maintains its shape when subjected to an air stream. Thus, whether the media is self-supporting or not depends on the physical properties of the media itself, the geometry or construction of the media, and the conditions to which the media is subjected in a particular end use application. Generally, a stiff self-supporting media preferably has a Gurley stiffness of greater than 50 milligrams for a sample size having a width of 2 inches and a length of 1.5 inches, and a soft non self-supporting media preferably has a Gurley stiffness of less than 30 milligrams for a sample size having a width of 2 inches and a length of 1.5 inches. For media having stiffness values between these values, whether the media is self-supporting depends on the construction of the media and on the end use application.

If the media is non self-supporting, spacing structure 8 is preferably provided over and attached to the entire inlet face 10 of the filter element 2 to provide reliable and uniform spacing and stability. On the other hand, if the media is self-supporting, the spacing structure 8 need not be provided over the entire inlet face 10 of the filter element 2. Rather, the spacing structure 8 may be provided only over the interior face region 14 of the media 4. Arranged in this manner, the spacing structure 8 provides spacing for the pleats 6 but also provides the filter element 2 with sufficient strength to allow the filter media 4 to be expanded to a predetermined length by a user for installation in a frame without distorting. Thus, in the case of a self-supporting media, the media will retain its shape when placed in an air stream so the spacing structure 8 need not be provided over the entire interior face region 14 to allow the filter element 2 to be easily expanded and placed in a frame.

A self-supporting filter media is Accuair 2.0 ounce per square yard available from Kimberly Clark Corporation, Neenah, Wis. having a Gurley stiffness of approximately 120 milligrams for a sample size having a width of 2 inches and a length of 1.5 inches. A non self-supporting filter media is Filtrete GCB 40 available from 3M Company, St. Paul, Minn. having a Gurley stiffness of approximately 15 milligrams for a sample size having a width of 2 inches and a length of 1.5 inches. A suitable spacing structure is a reinforcing fabric available from Bayex Inc., Albion, N.Y. under the product number DPM 4410 P3A-2-24. This product is an open scrim having four strands per inch of 70 denier polyester thread. This scrim is provided with a thermoplastic adhesive that allows the scrim to be heat laminated directly to the filter media.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A replaceable, reversibly collapsible and expandable air filter element for use with a reusable filter frame, said filter element comprising:
    (a) flexible reversibly collapsible and expandable filter media having an inlet side, an outlet side, opposed first and second ends, and an interior face region, said filter media comprising a plurality of pleats, each pleat including a fold line defining a pleat tip and a pair of adjacent panels; and
    (b) a flexible reversibly collapsible and expandable spacing structure attached to said filter media, said spacing structure comprising a flat sheet of material containing a plurality of evenly spaced openings and having an open structure that does not significantly interfere with the flow of air through the media.

2. A filter element as defined in claim 1, wherein said spacing structure is attached to said opposed first and second ends and said spacing structure is arranged adjacent said interior face region of said filter media.

3. A filter element as defined in claim 2, wherein said spacing structure is attached to said filter media interior face region.

4. A filter element as defined in claim 3, wherein said spacing structure comprises at least one of an open mesh, screen, net, and scrim.

5. A filter element as defined in claim 4, wherein said spacing structure is an open scrim formed of a synthetic plastic material.

6. A filter element as defined in claim 5, wherein said scrim is provided in the form of at least one strip arranged perpendicular to said fold lines along said interior face region of said filter media.

7. A filter element as defined in claim 1, wherein successive pleat tips define an attachment surface and said spacing structure is attached to said entire attachment surface.

8. A filter element as defined in claim 1, wherein said spacing structure is arranged along said filter media inlet side.

9. A filter element as defined in claim 8, further comprising a second spacing structure arranged along said filter media outlet side.

10. A filter element as defined in claim 9, wherein the length of said spacing structure between successive pleat tips is less than two times the length of a panel measured from one pleat tip to the next alternating pleat tip, whereby when the filter element is in its fully expanded condition, said spacing structure forms a generally planar structure and adjacent panels form an angle of less than 180 degrees.

11. A filter element as defined in claim 10, wherein the length of said spacing structure between successive pleat tips is equal, thereby providing uniform spacing of said pleat tips.

12. A filter element as defined in claim 1, further comprising attachment members along said opposed first and second ends of said filter media parallel to said fold lines for securing said filter element to the filter frame.

13. A filter element as defined in claim 1, wherein the length of said spacing structure between successive pleat tips is at least 5 millimeters.

14. A replaceable air filter element for use with a reusable filter frame, said filter element comprising:
    (a) reversibly collapsible and expandable filter media having an inlet side, an outlet aide, opposed first and second ends, and an interior face region, said filter media comprising a plurality of pleats, each pleat including a fold line defining a pleat tip and a pair of adjacent panels, wherein successive pleat tips define an attachment surface;
    (b) inelastic, flexible, open support structure attached to said filter media inlet side attachment surface, said support structure comprising a flat sheet of material selected from the group consisting of an open mesh, a screen, a net, and a scrim, said support structure containing a plurality of contiguous openings that do not significantly interfere with the flow of air through the media; and
    (c) attachment members arranged along said opposed first and second ends of said filter media parallel to said fold lines for securing said filter element to the filter frame.

\* \* \* \* \*

UNITED STATES PATENT AND TRADEMARK OFFICE
CERTIFICATE OF CORRECTION

PATENT NO. : 6,740,137 B2
DATED : May 25, 2004
INVENTOR(S) : Kubokawa, James O.

It is certified that error appears in the above-identified patent and that said Letters Patent is hereby corrected as shown below:

Column 8,
Line 10, delete "aide", insert in place thereof -- side --;
Line 16, insert -- an -- before "inelastic".

Signed and Sealed this

Third Day of May, 2005

JON W. DUDAS
*Director of the United States Patent and Trademark Office*